United States Patent
Munz et al.

(10) Patent No.: US 7,110,853 B2
(45) Date of Patent: Sep. 19, 2006

(54) PROCESSES AND DEVICES FOR COMPUTER-AIDED ADAPTATION OF AN APPLICATION PROGRAM FOR A MACHINE TOOL

(75) Inventors: Martin Munz, Leonberg (DE); Wilhelm Westermeyer, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 13 days.

(21) Appl. No.: 10/983,171

(22) Filed: Nov. 5, 2004

(65) Prior Publication Data

US 2005/0137741 A1 Jun. 23, 2005

(30) Foreign Application Priority Data

Nov. 6, 2003 (DE) .............................. 103 51 781

(51) Int. Cl.
*G06F 19/00* (2006.01)
*G05B 19/18* (2006.01)
*G05B 11/32* (2006.01)

(52) U.S. Cl. .................... 700/187; 700/63; 700/68; 700/69; 700/188; 700/193

(58) Field of Classification Search ................ 700/56, 700/57, 61–63, 67–69, 186–190, 192, 193; 82/1.11, 117, 118; 901/41
See application file for complete search history.

(56) References Cited

U.S. PATENT DOCUMENTS 3,595,106 A * 7/1971 Pomella et al. .............. 82/1.11
6,227,082 B1 * 5/2001 Hormansdorfer et al. ..... 82/1.11
6,597,968 B1 * 7/2003 Matsumoto et al. ......... 700/188
6,604,015 B1 * 8/2003 Iriguchi et al. ............. 700/187
6,647,314 B1 * 11/2003 Kato et al. ................. 700/187
6,735,545 B1 * 5/2004 Jayaram et al. ............. 702/127
6,922,606 B1 * 7/2005 Yutkowitz ................... 700/187
6,969,961 B1 * 11/2005 Tolkmitt et al. .............. 318/34

FOREIGN PATENT DOCUMENTS

| DE | 40 32 770 A1 | 4/1992 |
|---|---|---|
| EP | 0 706 104 B1 | 9/1998 |
| EP | 0 797 135 B1 | 7/2003 |
| EP | 1398681 A2 * | 3/2004 |

\* cited by examiner

*Primary Examiner*—Crystal J. Barnes
(74) *Attorney, Agent, or Firm*—Henry M. Feiereisen (57) ABSTRACT

A process and device for computer-aided adaptation of an application program for a machine tool is described. A sequence of control commands for feed axes of the machine tool defines a contour to be traveled by a tool relative to a workpiece. Based on the sequence of control commands, a computer determines sequential instructions for a round axle of the machine tool to track the contour and determines if, and possibly at which locations, the contour has angular or curvature discontinuities. When such angular or curvature discontinuities occur, the computer determines sequential instructions, so that the round axle begins to start accelerating before the angle or curvature discontinuities occurs, and the acceleration of the round axle terminates only after the angle or curvature discontinuity has ended.

20 Claims, 6 Drawing Sheets

PROCESSES AND DEVICES FOR COMPUTER-AIDED ADAPTATION OF AN APPLICATION PROGRAM FOR A MACHINE TOOL

CROSS-REFERENCES TO RELATED APPLICATIONS

This application claims the priority of German Patent Application, Ser. No. 103 51 781.2, filed Nov. 6, 2003, pursuant to 35 U.S.C. 119(a)–(d), the disclosure of which is incorporated herein by reference.

BACKGROUND OF THE INVENTION

The present invention relates, in general, to a process and device for computer-aided adaptation of an application program for a machine tool so as to move a round axle of the machine tool in conformance with a machined contour. The present invention also relates to a data carrier with a computer program stored on the data carrier for carrying out the process, and to a computer with a program memory having stored therein a computer program called by the computer. The present invention also relates to a machine tool with a controller configured to control the machine tool.

Nothing in the following discussion of the state of the art is to be construed as an admission of prior art.

Machine tools and application programs for machine tools that adapt such application programs to various machining operations are known in the art.

In such machining operations, the tool can have an edge, such as a cutting edge of a glass cutter. The machine tool operates optimally by moving the cutter along a contour relative to the machined workpiece. The contour is defined by a sequence of control commands for the feed axes of the machine tool that are part of an application program. The edge of the tool should always be oriented tangentially to the traveled contour. This orientation of the tool is affected by a round axle that rotates the tool or the workpiece.

The control commands for the round axle can also be part of the application program, although it may be necessary to separately program the control commands for the round axle. This would require a substantial programming task for the user when generating the application program.

In state-of-the-art applications, the round axle is therefore typically defined as a secondary axis, with its desired position being determined by the computer based on the control commands for the feed axes. This process operates quite satisfactory for a control command that describes, for example, a straight section or a evenly curved section of the contour. However, if the contour includes discontinuities in the angle or curvature, a contour error occurs which can cause the tool edge to have a significant misorientation at the angular or curvature discontinuity relative to the contour. Curvature discontinuities occur, for example, at a transition from a straight line to a curved line, and vice versa. Angular discontinuities occur, for example, at the corner points of a polygonal trace.

It would therefore be desirable and advantageous to provide an improved device and process for computer-aided adaptation of application programs for a machine tool, which obviates prior art shortcomings and is able to specifically improve tracking of the round axle using sequential instructions processed by a computer.

SUMMARY OF THE INVENTION

According to one aspect of the invention, a computer-aided process for controlling a machine tool includes the steps of providing to a computer a sequence of control commands for feed axes of the machine tool that define a contour to be traversed by a tool relative to a workpiece. Based on the sequence of control commands, the computer determines a location of an angular or a curvature discontinuity in the contour and sequential instructions for a round axle of the machine tool so as to enable the tool to follow the contour. The sequential instructions, if an angular or a curvature discontinuity is detected, cause the round axle to begin an acceleration before the angle or curvature discontinuity occurs and cause the round axle to terminate the acceleration after the angle or curvature discontinuity has ended.

The term acceleration used in the context of this application also includes deceleration. The process of the present invention therefore determines predicatively if such discontinuity occurs and, if necessary, predicatively counteracts the adverse effect of this discontinuity.

If an attack point of the tool is located at the center of the round axle, then rotation of the round axle has no effect on the position of the attack point relative to the workpiece.

However, if the attack point of the tool is offset from the round axle, then the computer determines, based on the sequential instructions and the offset, feed axes corrections to be used to correct the control commands. In this way, a positional change caused by the offset configuration of the attack point during rotation of the round axle is automatically corrected.

According to an advantageous embodiment of the invention, ideal commands for the round axle can be determined based on the contour, and the computer can determine the sequential instructions such that a ratio between a magnitude of an integral of a deviation of the sequential instructions from the ideal commands before the angle or curvature discontinuity and a magnitude of an integral of a deviation of the sequential instructions from the ideal commands after the angle or curvature discontinuity has a predetermined value, for example, a value between 0.5 and 2.0, preferably a value between 0.8 and 1.2. Ideally, the ratio is equal to 1.0.

The ratio can be a fixed value resident in the computer. Alternatively, the ratio can be provided to the computer by a user and/or with the application program.

According to another advantageous embodiment of the invention, if an angular or a curvature discontinuity is detected, the computer can determine the sequential instructions such that the round axle will be able to track during a time interval that is between 100% and 200% of a minimum time interval, as determined by the determined angle or curvature discontinuity, and a maximum dynamic response of the round axle. The computer can then determine the sequential instructions so that the angular acceleration of the round axle is continuous.

Like the ratio of the integrals, the percentage and/or the maximum dynamic response can be defined as a fixed value. Alternatively, the percentage and/or the maximum dynamic response can be provided to the computer by a user, for example with the application program.

According to yet another advantageous embodiment of the invention, if an angular or a curvature discontinuity is detected, the computer can change the control commands before determining the sequential instructions, so that a contour defined by the changed control commands deviates from an original contour by at most a tolerance limit, thereby at least diminishing the angular or curvature discontinuity. This improves tracking of the round axle within the allowed tolerances of the contour deviations.

The tolerance limits can also reside in the computer as fixed values. However, tolerance limit can also be provided to the computer by a user, for example with the application program.

As mentioned above, ideal commands for the round axle can be determined by the contour. Advantageously, the computer can determine, based on the sequential instructions and the ideal commands, a maximum angular error for the round axle during the execution of the sequential instructions and then reduce the travel speed of the tool relative to the workpiece, if the maximum angular error exceeds a maximal allowable angular error. The round axle is then always tracked with sufficient accuracy.

The maximal allowable angle error can also reside in the computer as a fixed value or can be defined by a user, for example in the application program.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
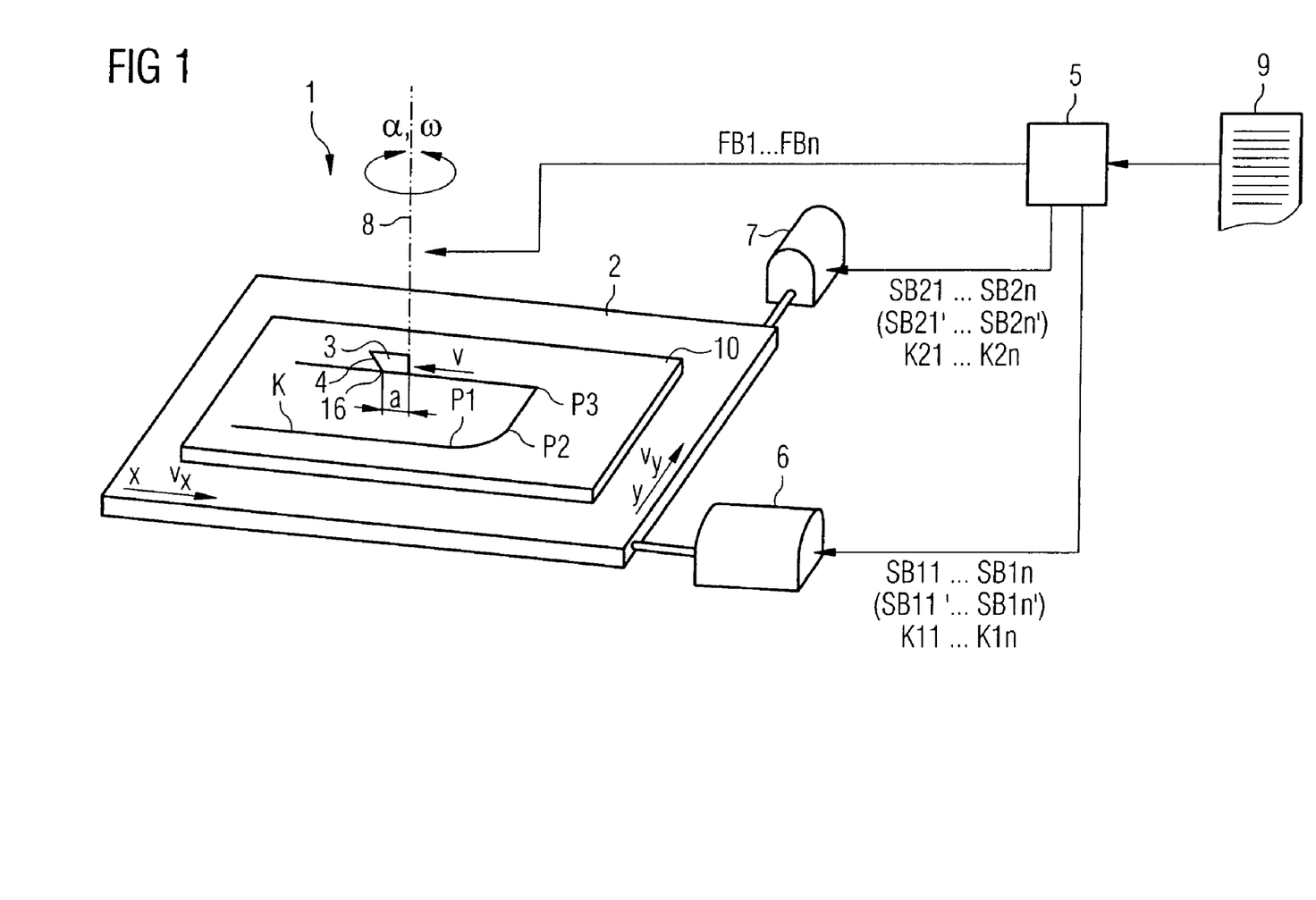
FIG. 1 shows schematically a machine tool controlled by a computer according to the present invention.

Turning now to the drawing, and in particular to FIG. 1, there is shown a machine tool 1 which includes a workpiece table 2, a tool 3 with a tool edge 4, and a controller 5. The workpiece table 2 has feed axes 6, 7 and can be adjusted in a two-dimensional plane. The feed axes 6, 7 are preferably oriented perpendicular to each other, and their directions are hereinafter referred to as x-axis and y-axis, respectively.

The tool 3 is supported along a round axle 8. The round axle 8 is oriented perpendicular to the plane defined by the respective x- and y-directions of the feed axes 6, 7. The tool 3 can be rotated about the round axle 8.

The controller 5 executes a control program 9, which causes, inter alia, movement of the tool 3 relative to a workpiece 10 a long a contour K. The round axle 8 is thereby controlled by the controller 5 according to a control program 9 that keeps the tool edge 4 always essentially parallel to the contour K.

According to FIG. 2, the control program 9 is determined as follows: initially, a computer program 12 is provided to the controller 5 on a suitable data carrier 11, for example a CD-ROM or a diskette. The computer program 12 is stored on the data carrier 11 exclusively in machine-readable form. It is transferred by the controller 5 to and stored in a non-volatile program memory 13, for example, an EEPROM 13. The computer program 12 is read from the program memory 13 when called. The controller then performs, based on the computer program 12, a computer-aided adaptation process for an application program 14, which is then used to generate the control program 9. This aspect of the process will be described in more detail hereinafter with reference to FIG. 3.

Figure 2:
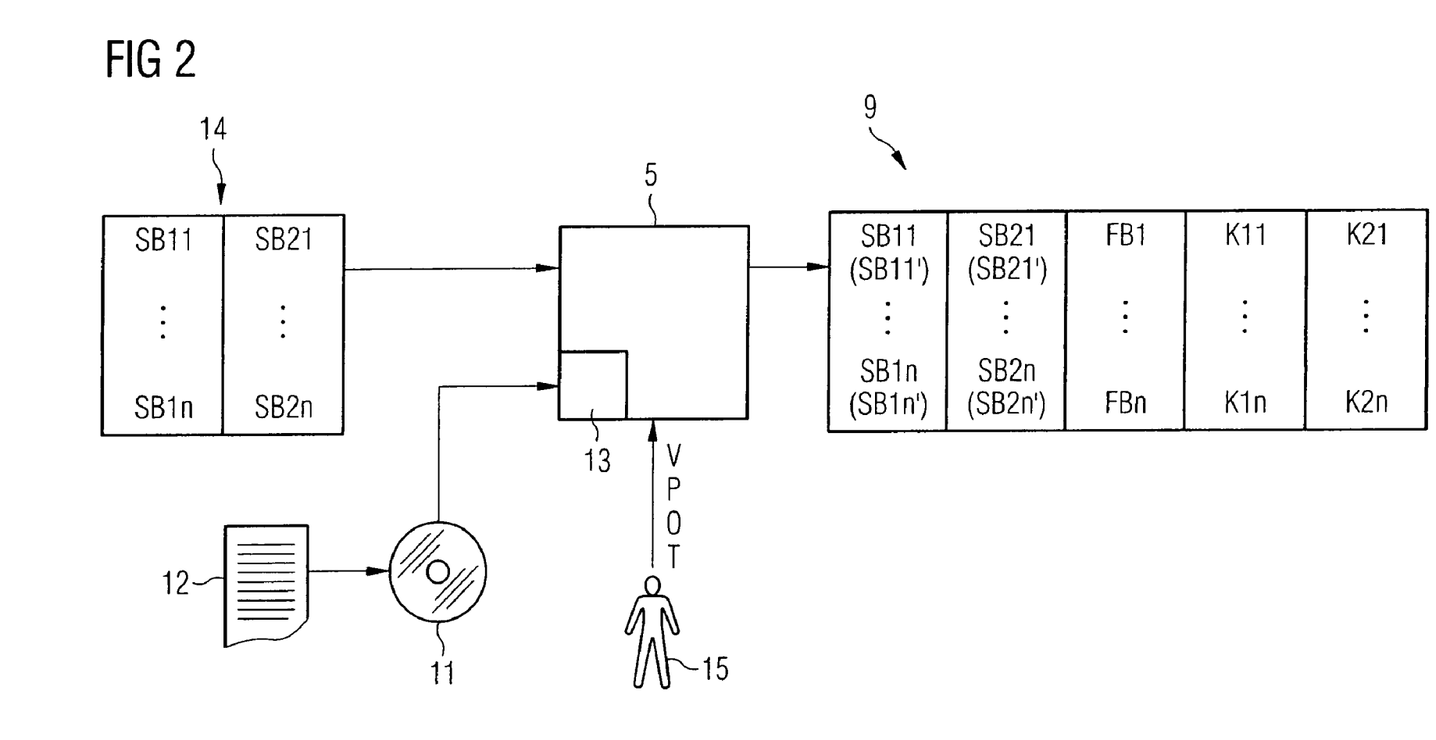
FIG. 2 shows schematically the operation of the computer of FIG. 1.
Figure 3A:
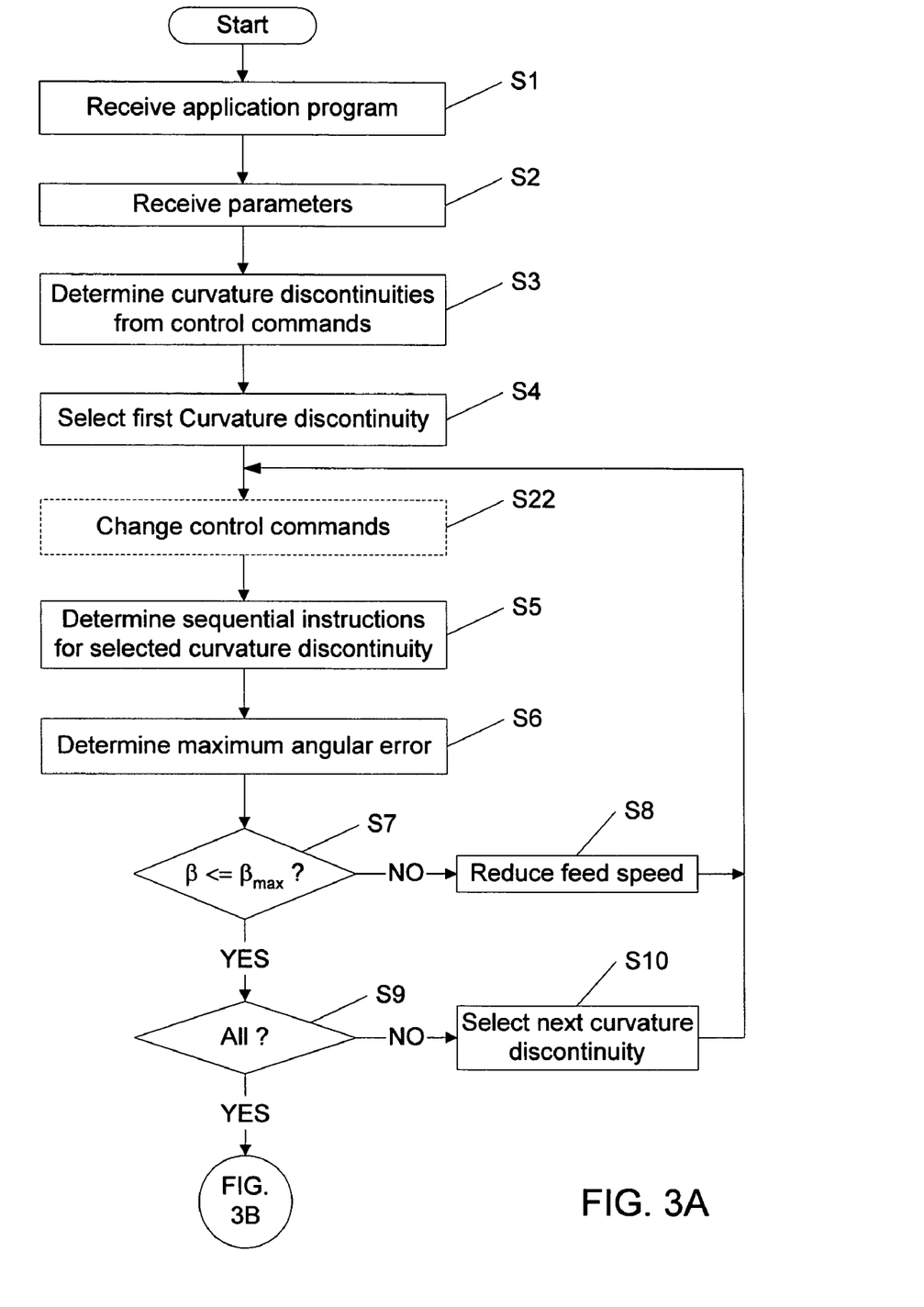
FIG. 3A shows part of a process flow diagram for controlling a tool according to the present invention in the presence of curvature discontinuities.
Figure 4:
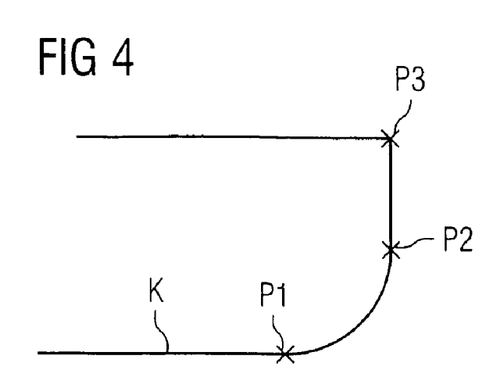
FIG. 4 depicts a contour to be traversed by a tool.

Referring now to FIG. 3, the controller 5 receives in step S1 the application program 14 for the machine tool 1. The application program 14 includes, as seen in FIG. 2, a sequence of control commands SB11 to SB1$n$ for the first feed axis 6, and a sequence of a corresponding control commands SB21 to SB2$n$ for the second feed axis 7. The control commands SB11 to SB1$n$, SB21 to SB2$n$ define the contour K, which is also shown in FIG. 4 as a top view on the xy-plane.

As shown in FIG. 3, the controller 5 then receives in step S2 a number of the parameters V, P, D, T, βmax. The parameters V, P, D, T, βmax can be entered into the controller 5, for example, directly by a user 15 or can be part of the application program 14. In this case, they are indirectly defined by the user 15, because the user also tends to generate the application program 14. Mixed implementations are also possible, wherein the parameters V, P, D, T, βmax are in part defined by the user 15 and in part in the application program 14.

The parameters V, P, D, T, $β_{max}$ include a ratio V, a percentage P, a maximum dynamic response D of the round axle 8, a tolerance threshold T, and a maximum allowable angle error $β_{max}$. The significance of the parameters V, P, D, T, $β_{max}$ will be described below. However, it should be mentioned at this point that the ratio V is preferably between 0.5 and 2, more particularly between 0.8, and 1.2. One particular example of the ratio is V=1.0. The percentage P should also be between 100% and 200%, preferably between 130% and 200%.

In step S3, the controller 5 determines based on the sequence of control commands SB11 to SB1$n$, SB21 to SB2$n$ if and optionally, at which locations P1, P2 the contour K has curvature discontinuities. As seen in the example of FIG. 4, these are the locations P1, P2 because the contour K includes a quarter circle extending from the location P1 to the location P2, while the contour K is linear before the point P1 and after the point P2. For sake of simplicity, it will be assumed that the contour K extends parallel to the x-direction of the feed axis 6 before the quarter circle and parallel to the y-direction of the feed axis 7 after the quarter circle.

Figure 5:
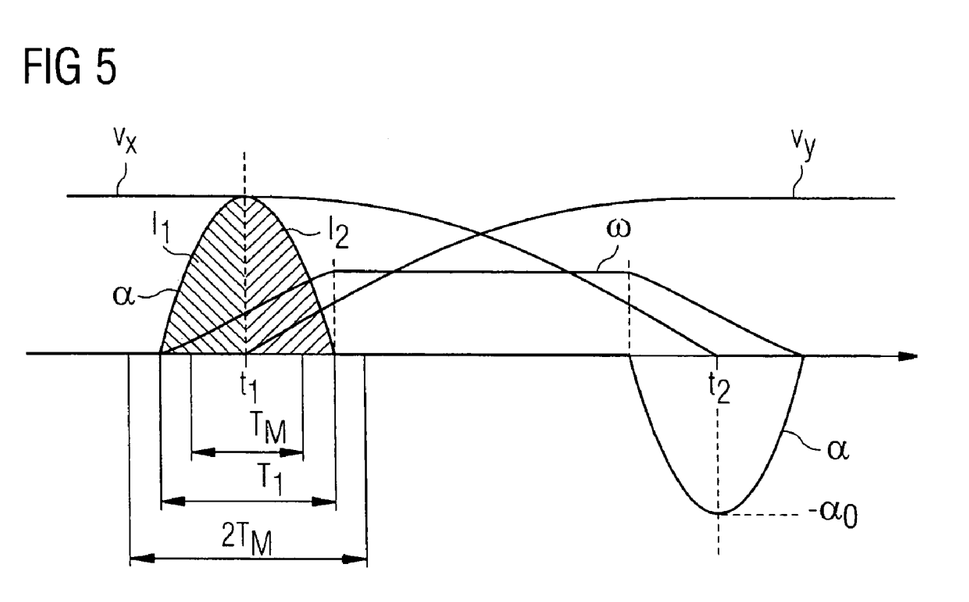
FIG. 5 shows the acceleration and deceleration of the angular velocity of the round axle of the tool as a function of time for a curvature discontinuity.

The contour K is traversed by the tool 3 preferably with a constant travel speed v. As shown in FIG. 5, a feed speed $v_x$ of the feed axis 6 has a constant value $v_x=v$ before a time $t_1$. From the time $t_1$ until a time $t_2$ the tool 3 travels along the quarter cycle. The feed speed $v_x$ thereby decreases sinusoidally to zero, whereas the feed speed $v_y$ of the other feed axis 7 increases sinusoidally from zero until it reaches the value $v_y=v$. The feed speed $v_y$ of the second feed axis 7 then maintains a constant value v. This process described in conjunction with FIG. 5 is defined by the control commands SB11 to SB1n, SB21 to SB2n.

As shown in FIG. 5, according to the invention, the round axle 8 is accelerated before and after the time $t_1$. As seen in FIG. 5, an angular acceleration α increases steadily from zero to a maximum value $α_0$ over a time interval $T_1$ and then decreases again to zero. The curve of the angular acceleration α is thereby preferably symmetric to the maximum value $α_0$. For example, the curve of the angular acceleration α can be a parabola or a half-wave of a sinusoidal oscillation. Preferably, the maximal value $α_0$ of the angular acceleration α is reached at the time $t_1$.

The maximal value $α_0$ of the angular acceleration α corresponds preferably to the maximum dynamic response D of the round axle 8. Optionally, the value can also be slightly smaller. For the parabolic or a sinusoidal curve of the angular acceleration α, the time interval $T_1$ is between 100% and 200% of a minimum time interval $T_M$ defined by the detected curvature discontinuities and the maximum dynamic response D of the round axle 8.

The curve of the angular velocity ω of the round axle 8 before and after the curvature discontinuity also tracks the curve of the angular acceleration α depicted in FIG. 5.

As seen in FIG. 3A, the location P1 of the first curvature discontinuity is selected, step S4. For this first curvature discontinuity, the controller 5 then determines sequential instructions FB1 to FBn for the round axle 8 to be tracked, step S5. The sequential instructions FB1 to FBn are determined based on the curve of the angular acceleration α and/or of the angular velocity ω, as described above with reference to FIG. 5. The sequential instructions FB1 to FBn are hence determined by the controller 5 in such a way that the round axle 8 is already accelerated before the curvature discontinuity, with the acceleration of the round axle 8 terminated only after the curvature discontinuity.

Based on the selection of the maximal value $α_0$ of the angular acceleration α (approximately maximum dynamic response D) and the time dependence of the angular acceleration α (sinusoidal or parabolic), the corresponding time interval $T_1$ is then between P=100% and 200% of the minimum time interval $T_M$ required for achieving the minimum required acceleration of the round axle 8. The minimum time interval $T_M$ is defined so that the round axle 8 is accelerated during the minimum time interval $T_M$ with a constant value corresponding to the maximum dynamic response D, whereby the resulting change in the angular velocity ω corresponds to the curvature discontinuity.

With the afore-described process, the controller 5 determines the sequential instructions FB1 to FBn so that the angular acceleration α of the round axle 8 is continuous.

Ideally, the round axle 8 would not be accelerated before and after the time $t_1$, and would only be accelerated at the time $t_1$ by a Delta-function impulse. If it were possible to realize sequential instructions of this type, then these commands would represent ideal commands for the acceleration α of the round axle 8. Such ideal commands, however, cannot be realized. However, by determining the sequential instructions FB1 to FBn in the afore-described manner, the integral of the deviation of the sequential instructions FB1 to FBn from the ideal commands before and after the curvature discontinuity, as indicated in FIG. 5 by $I_1$ and $I_2$, can have a ratio of V=1.

As described above with reference to step S1, the ratio V and the percentage P can also be entered into the controller 5 in addition to the maximum dynamic response D of the round axle 8. The ratio V can be adjusted, for example, when the sequential instructions FB1 to FBn are determined, by arranging the curve of the angular acceleration α not symmetrically with respect to the time $t_1$, but instead with a slight advance or delay. For example, above a range of 150%, the percentage P can be adjusted by lowering the maximal value $α_0$ of the angular acceleration α below the maximal dynamic response D of the round axle 8. In the range between 100% and 150%, the curve of the angular acceleration α can be varied accordingly. For example, relatively steep ramps can be implemented at the beginning and at the end of the acceleration curve, while the angular acceleration α is set equal to the maximum dynamic response D between the ramps.

In step S6, the computer 5 determines, based on the sequential instructions FB1 to FBn and the ideal commands, the maximal angular error β assumed by the round axle 8 during the execution of the sequential instructions FB1 to FBn. The computer 5 then compares the maximal angular error β with the maximal allowable angular error $β_{max}$, step S7. If the maximal angular error β exceeds the maximal allowable angular error $β_{max}$, then the computer 5 reduces the feed speed v, step 8, and returns to step S5. Otherwise, the process branches to step S9.

In step S9, the process checks if additional curvature discontinuities exist. If this is the case, then the next location with a curvature discontinuity, in the present example the location P2, is selected in the following step S10, whereafter the process returns to step S5. Otherwise, the process branches from step S9 to step S11.

In step S11, the controller determines, like in the determination of the curvature discontinuities in step S3 above, based on the sequence of control commands Sb11 to SB1n, SB21 to SB2n, if and, optionally, at which locations the contour K has angular discontinuities. As shown in the example of FIG. 4, this occurs at the location P3.

Since the location P3 is, if possible, also traversed with a constant feed speed v, the feed speed $v_y$ also decreases at a corresponding time $t_3$ approximately stepwise from the value of the feed speed v to zero, while at the same time the feed speed $v_x$ increases from zero to the feed speed v. According to FIG. 6, the round axle 8 is first accelerated during a time interval $T_2$ and immediately thereafter decelerated. The temporal curve of the angular acceleration α is therefore point-symmetric to the zero crossing of the angular acceleration α, and frequently also symmetric to the time $t_3$. Moreover, the maximal value $α_0$ of the angular acceleration α is preferably equal to or slightly less than the maximum dynamic response D of the round axle 8. The time dependence of the angular acceleration α can also be sinusoidal. Alternatively, it can also be a third order parabola or another point-symmetric curve.

Figure 6:
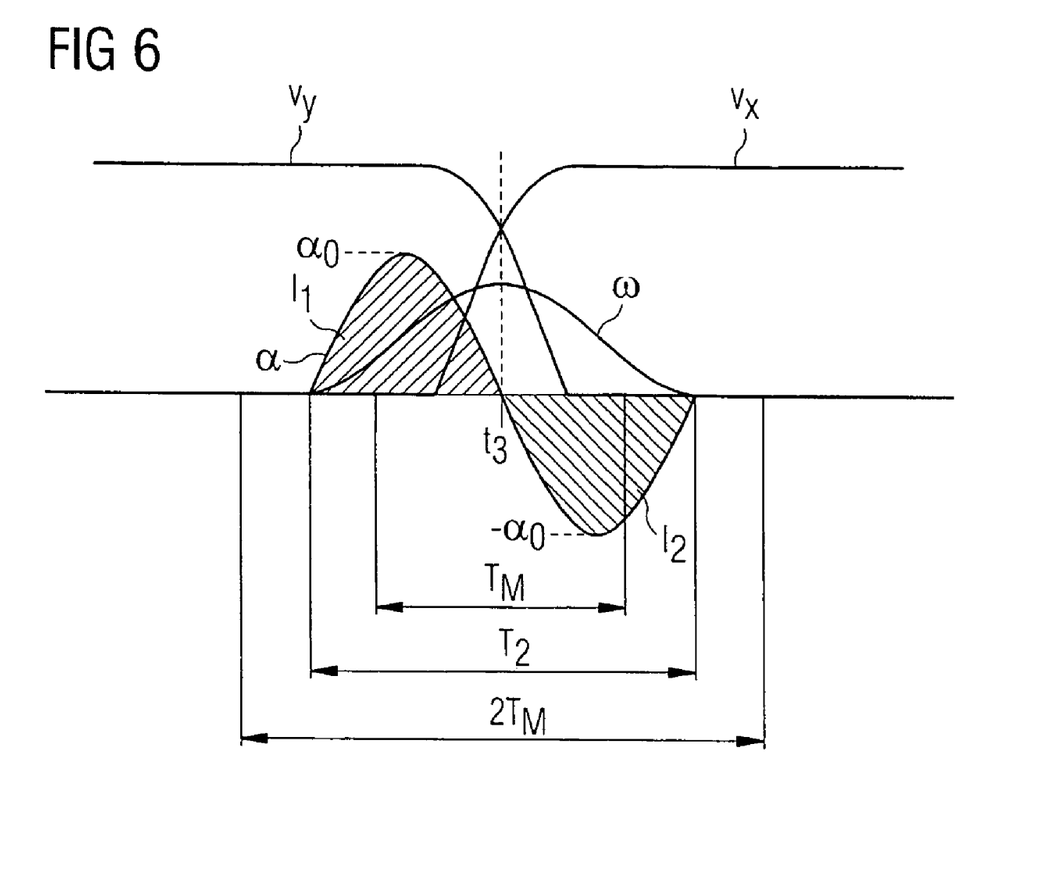
FIG. 6 shows the acceleration and deceleration of the angular velocity of the round axle of the tool as a function of time for an angular discontinuity.

The angular velocity ω of the round axle 8 then also assumes the time dependence depicted in FIG. 6. It is evident that the round axle 8 starts to accelerate already before the angular discontinuity in the presence of angular discontinuities, with the acceleration of the round axle 8 terminating only after the end of the angular discontinuity.

Referring now to FIG. 3B, in analogy to the approach described above with reference to the curvature discontinuities, a first location with an angular discontinuity is selected, step S12. According to the embodiment of FIG. 4, this is the location P3. For the selected location P3, in step S13 sequential instructions FB1 to FBn are determined according to the curve of the angular acceleration α or the angular velocity ω depicted in FIG. 6. The process for an angular discontinuity is therefore completely analogous to the process for a curvature discontinuity, so that the process will not be described in detail.

In step S14, the maximal angular error β assumed by the round axle 8 when executing the sequential instructions FB1 to FBn is determined. The process checks in step S15 if the maximal allowable angular error $β_{max}$ has been exceeded. If necessary, the feed speed v is reduced in step S16, with the process returning to and executing step S13.

Otherwise, it is checked in step S17 if additional locations with angular discontinuities are to be processed. If this is a case, then the next location with an angular discontinuity is selected, step S18, whereafter the process returns to step S13. Otherwise, the process continues with step S19, when the control commands SB11 to SB1n, SB21 to SB2n and the sequential instructions FB1 to FBn are stored by the controller 5 in control program 9.

With the adaptation process according to the invention, the round axle 8 is able to follow the contour K significantly better than with conventional processes. The adaptation process of the invention can also be expanded, in particular when an effective attack point 16 of the tool edge 4 is not located on the round axle 8, but has an offset a from the axis 8. This is shown in FIG. 1.

When the attack point 16 has an offset a from the round axle 8, then the attack point 16 relative to the workplace 10 changes in addition to the angle of the tool edge 4 in the x-y-plane, when the round axle 8 rotates. The offset is determined by the current orientation of the round axle 8, the angle by which the round axle 8 is rotated, and the offset a of the attack point 16 from the round axle 8. Preferably, the controller 5 then determines in a step S20 based on the sequential instructions FB1 to FBn, in conjunction with the offset a, feed correction values K11 to K1n, K21 to K2n for the control commands SB11 to SB1n, SB21 to SB2n. When the control commands SB11 to SB11n, SB21 to SB2n are executed, the control commands SB11 to SB1n, SB21 to SB2n are then corrected by the feed correction values K11 to K1n, K21 to K2n.

Figure 3B:
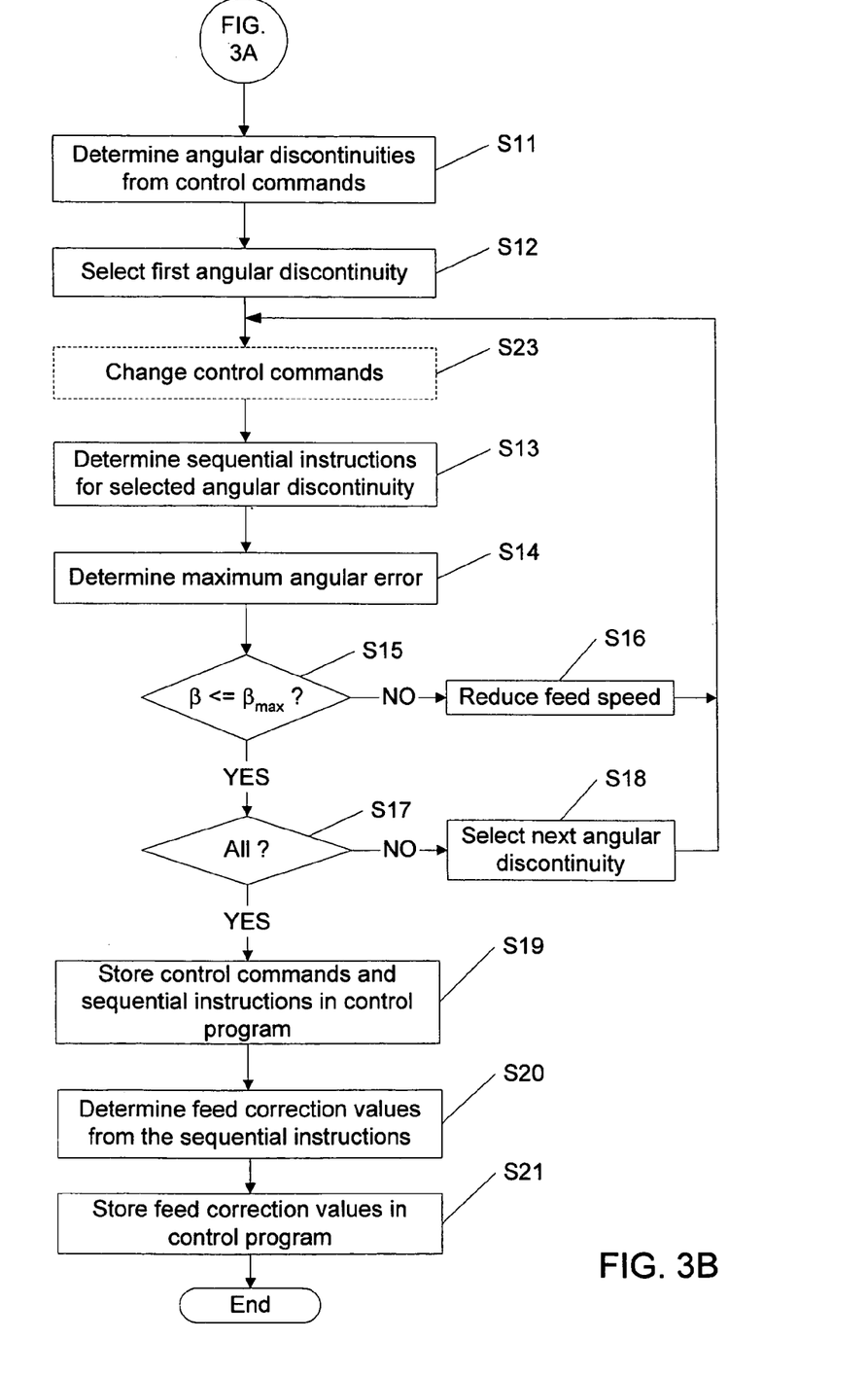
FIG. 3B shows part of a process flow diagram for controlling a tool according to the invention in the presence of angular discontinuities.

According to FIGS. 2 and 3B, the feed correction values K11 to K1n, K21 to K2n are stored in step S21 as separate values in the control program 9 and used by the controller 5 to correct the control commands SB11 to SB1n, SB21 to SB2n. Alternatively, corrected control commands can also be determined and stored in the control program 9. For clarification, it should be mentioned that the sequential instructions FB1 to FBn, which are determined based on the original control commands SB11 to SB1n, SB21 to SB2n, remain unchanged.

It is also possible to insert steps S22 (see FIG. 3A) and S23 (see FIG. 3B) before the steps S5 and S13, respectively. In the steps S22 and S23, the controller 5 changes the control commands SB11 to SB1n, SB21 to SB2n so that the changed control commands SB11' to SB1n', S821' to SB2n' define a changed contour K'. The changed contour K' deviates from the original contour K at most by the tolerance threshold T. The changed contour K' is determined so that simultaneously (at step S22) the curvature discontinuity and/or (in step S23) the angular discontinuity are reduced or even completely eliminated.

If the control commands SB11 to SB1n, SB21 to SB2n are changed in steps S22 and S23, then the changed control commands SB11' to SB1n', SB21' to SB2n' are stored in the control program 9 instead of the original control commands SB11 to SB1n, SB21 to SB2n, step S21.

If steps S22 and S23 are present, then the changed control commands SB11' to SB1n', SB21' to SB2n' are used to determine the sequential instructions FB1 to FBn.

Figure 7:
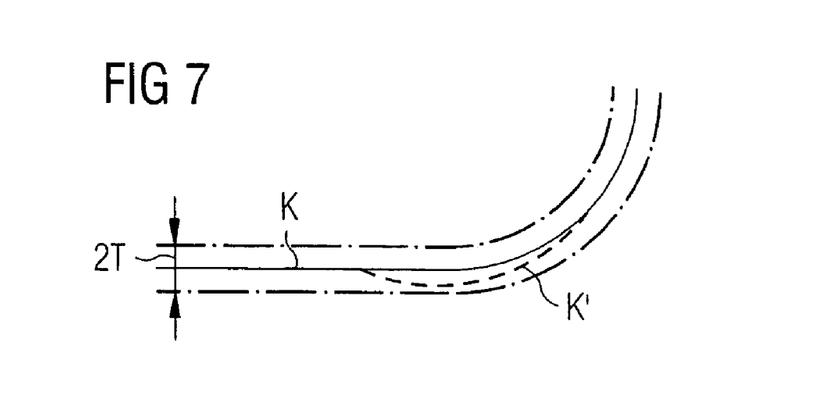
FIG. 7 shows a detail of FIG. 4 with a predefined tolerance threshold.

The determination of the changed control commands SB11' to SB1n', SB21' to SB2n' will now be described again with reference to FIG. 7. FIG. 7 shows an exemplary region of the contour K around the location P1. The continuous line in FIG. 7 shows the ideal curve of the contour K, as defined by the original control commands SB11 to SB1n, SB21 to SB2n. The dashed lines in FIG. 7 indicate a tolerance band about the contour K extending on both sides of the contour K, with a distance from the contour K corresponding to the tolerance threshold T.

For example, if the control commands SB11 to SB1n, SB21 to SB2n are changed before and after the location P1, then the changed contour K' based on the changed control commands SB11' to SB1n', SB21' to SB2n' and indicated in FIG. 7 by the dashed line is traversed.

As clearly seen in FIG. 7, the changed contour K' deviates from the original contour K by at most the tolerance threshold T. The curvature discontinuity can be simultaneously reduced, while small curvature discontinuities may be eliminated completely. Likewise, an angular discontinuity can be reduced or may also be eliminated completely.

The adaptation process according to the invention can be used to significantly improve tracking of the round axle 8. A maximum angular error of the round axle 8 is typically between 10% and 50% of the angular error of a corresponding to conventional process. The round axle 8 can also be controlled much more stably. The generation of the computer program 12 does not require significant added resources.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A computer-aided process for controlling a machine tool, comprising the steps of:

providing to a computer a sequence of control commands for feed axes of the machine tool that define a contour to be traversed by a tool relative to a workpiece;

determining, based on the sequence of control commands, a location of an angular or a curvature discontinuity in the contour, determining, based on the sequence of control commands, sequential instructions for a round axle of the machine tool to enable the tool to follow the contour, and determining ideal commands for the round axle based on the contour, and the computer determining the sequential instructions such that a ratio of a magnitude of an integral of a deviation of the sequential instructions from the ideal commands before the angle or curvature discontinuity and a magnitude of an integral of a deviation of the sequential instructions from the ideal commands after the angle or curvature discontinuity has a predetermined value, wherein the sequential instructions, if an angular or a curvature discontinuity is detected cause the round axle to be in an acceleration before the angle or curvature discontinuity occurs and cause the round axle to terminate the acceleration after the angle or curvature discontinuity has ended, wherein the ratio is between 0.5 and 2.0.

2. The process of claim 1, wherein if an attack point of the tool is offset from the round axle, the computer determines, based on the sequential instructions, feed axis corrections that are used to correct the control commands.

3. The process of claim 1, further including the steps of determining ideal commands for the round axle based on the contour, determining based on the sequential instructions and the ideal commands a maximum angular error for the round axle during the execution of the sequential instructions, and reducing a travel speed of the tool relative to the workpiece, if the maximum angular error exceeds a maximal allowable angular error.

4. The process of claim 3, wherein the maximum allowable angular error is provided to the computer by a user.

5. The process of claim 1, wherein the ratio is between 0.8 end 1.2.

6. A computer-aided process for controlling a machine tool, comprising the steps of:
   providing to a computer a sequence of control commands for feed axes of the machine tool that define a contour to be traversed by a tool relative to a workpiece;
   determining, based on the sequence of control commands, a location of an angular or a curvature discontinuity in the contour,
   determining, based on the sequence of control commands, sequential instructions for a round axle of the machine tool to enable the tool to follow the contour; and
   determining ideal commands for the round axle based on the contour, and the computer determining the sequential instructions such that a ratio of a magnitude of an integral of a deviation of the sequential instructions from the ideal commands before the angle or curvature discontinuity and a magnitude of an integral of a deviation of the sequential instructions from the ideal commands after the angle or curvature discontinuity has a predetermined value,
   wherein the sequential instructions, if an angular or a curvature discontinuity is detected, cause the round axle to beam an acceleration before the angle or curvature discontinuity occurs and cause the round axle to terminate the acceleration after the angle or curvature discontinuity has ended,
   wherein the ratio is provided to the computer by a user.

7. The process of claim 6, wherein if an attack point of the tool is offset from the round axle, the computer determines, based on the sequential instructions, feed axis corrections that are used to correct the control commands.

8. The process of claim 6, further including the steps of determining ideal commands for the round axle based on the contour, determining based on the sequential instructions and the ideal commands a maximum angular error for the round axle during the execution of the sequential instructions, and reducing a travel speed of the tool relative to the workpiece, if the maximum angular error exceeds a maximal allowable angular error.

9. The process of claim 8, wherein the maximum allowable angular error is provided to the computer by a user.

10. A computer-aided process for controlling a machine tool, comprising the steps of:
    providing to a computer a sequence of control commands for feed axes of the machine tool that define a contour to be traversed by a tool relative to a workpiece;
    the computer determining, based on the sequence of control commands, a location of an angular or a curvature discontinuity in the contour, and
    the computer determining, based on the sequence of control commands, sequential instructions for a round axle of the machine tool to enable the tool to follow the contour,
    wherein the sequential instructions, if an angular or a curvature discontinuity is detected, cause the round axle to begin an acceleration before the angle or curvature discontinuity occurs and cause the round axle to terminate the acceleration after the angle or curvature discontinuity has ended,
    wherein if an angular or a curvature discontinuity is detected, the computer changes the control commands before determining the sequential instructions, so that a contour defined by the changed control commands deviates from an original contour by at most a tolerance limit, thereby at least diminishing the angular or curvature discontinuity.

11. The process of claim 10, wherein the tolerance limit is provided to the computer by a user.

12. The process of claim 10, wherein if an attack point of the tool is offset from the round axle, the computer determines, based on the sequential instructions, feed axis corrections that are used to correct the control commands.

13. The process of claim 10, further including the steps of determining ideal commands for the round axle based on the contour, determining based on the sequential instructions and the ideal commands a maximum angular error for the round axle during the execution of the sequential instructions, and reducing a travel speed of the tool relative to the workpiece, if the maximum angular error exceeds a maximal allowable angular error.

14. The process of claim 13, wherein the maximum allowable angular error is provided to the computer by a user.

15. A computer-aided process for controlling a machine tool, comprising the steps of:
    providing to a computer a sequence of control commands for feed axes of the machine tool that define a contour to be traversed b a tool relative to a workpiece;
    the computer determining, based on the sequence of control commands, a location of an angular or a curvature discontinuity in the contour, and
    the computer determining, based on the sequence of control commands, sequential instructions for a round axle of the machine tool to enable the tool to follow the contour,
    wherein the sequential instructions, if an angular or a curvature discontinuity is detected, cause the round axle to begin an acceleration before the angle or curvature discontinuity occurs and cause the round axle to terminate the acceleration after the angle or curvature discontinuity has ended,
    wherein if an angular or a curvature discontinuity is detected, the computer determines the sequential instructions such that the round axle tracks during a time interval that is between a percentage of between 100% and 200% of a minimum time interval as determined by the determined angle or curvature discontinuity and a maximum dynamic response of the round axle.

16. The process of claim 15, wherein if an attack point of the tool is offset from the round axle, the computer determines, based on the sequential instructions, feed axis corrections that are used to correct the control commands.

17. The process of claim 15, further including the steps of determining ideal commands for the round axle based on the contour, determining based on the sequential instructions and the ideal commands a maximum angular error for the round axle during the execution of the sequential instructions, and reducing a travel speed of the tool relative to the workpiece, if the maximum angular error exceeds a maximal allowable angular error.

18. The process of claim 17, wherein the maximum allowable angular error is provided to the computer by a user.

19. The process of claim 15, wherein the computer determines the sequential instructions so that the angular acceleration of the round axle is continuous.

20. The process of claim 15, wherein the percentage or the maximum dynamic response, or both, are provided to the computer by a user.

* * * * *